US012086725B2

(12) United States Patent
Golconda et al.

(10) Patent No.: US 12,086,725 B2
(45) Date of Patent: Sep. 10, 2024

(54) HYPER PARAMETER TUNING FOR MACHINE LEARNING MODELS

(71) Applicant: Oracle International Corporation, Redwood Shores, CA (US)

(72) Inventors: Suresh Kumar Golconda, Fremont, CA (US); Vijayalakshmi Krishnamurthy, Sunnyvale, CA (US); Someshwar Maroti Kale, Bangalore (IN); Sujay Sarkhel, San Jose, CA (US); Nickolas Kavantzas, Emerald Hills, CA (US); Mohan U. Kamath, Fremont, CA (US); Neelesh Kumar Shukla, Lucknow (IN); Vidya Mani, Bangalore (IN); Amit Vaid, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 1040 days.

(21) Appl. No.: 16/987,148

(22) Filed: Aug. 6, 2020

(65) Prior Publication Data

US 2022/0044130 A1 Feb. 10, 2022

(51) Int. Cl.
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC ............ G06N 5/04; G06N 20/00; G06N 5/01
See application file for complete search history.

(56) References Cited

U.S. PATENT DOCUMENTS

| | | | | |
|---|---|---|---|---|
| 2018/0285759 A1* | 10/2018 | Wood | ...................... | G06N 3/006 |
| 2020/0027033 A1* | 1/2020 | Garg | ........................ | G06F 17/18 |
| 2020/0372342 A1* | 11/2020 | Nair | ..................... | G06F 16/2246 |
| 2021/0073995 A1* | 3/2021 | Yang | ........................ | G06N 3/08 |

* cited by examiner

*Primary Examiner* — Hope C Sheffield
(74) *Attorney, Agent, or Firm* — Invoke

(57) ABSTRACT

Techniques for selecting universal hyper parameters for use in a set of machine learning models across multiple computing environments include detection of a triggering condition for tuning a set of universal hyper parameters. The set of universal hyper parameters dictate configuration of the set of machine learning models that are independently executing, respectively, in the multiple computing environments. Based on the detected triggering condition, a first subset of universal hyper parameters from the set of universal hyper parameters are altered to generate a second set of universal hyper parameters. The second set of universal hyper parameters are applied to the set of machine learning models across the multiple computing environments.

20 Claims, 6 Drawing Sheets

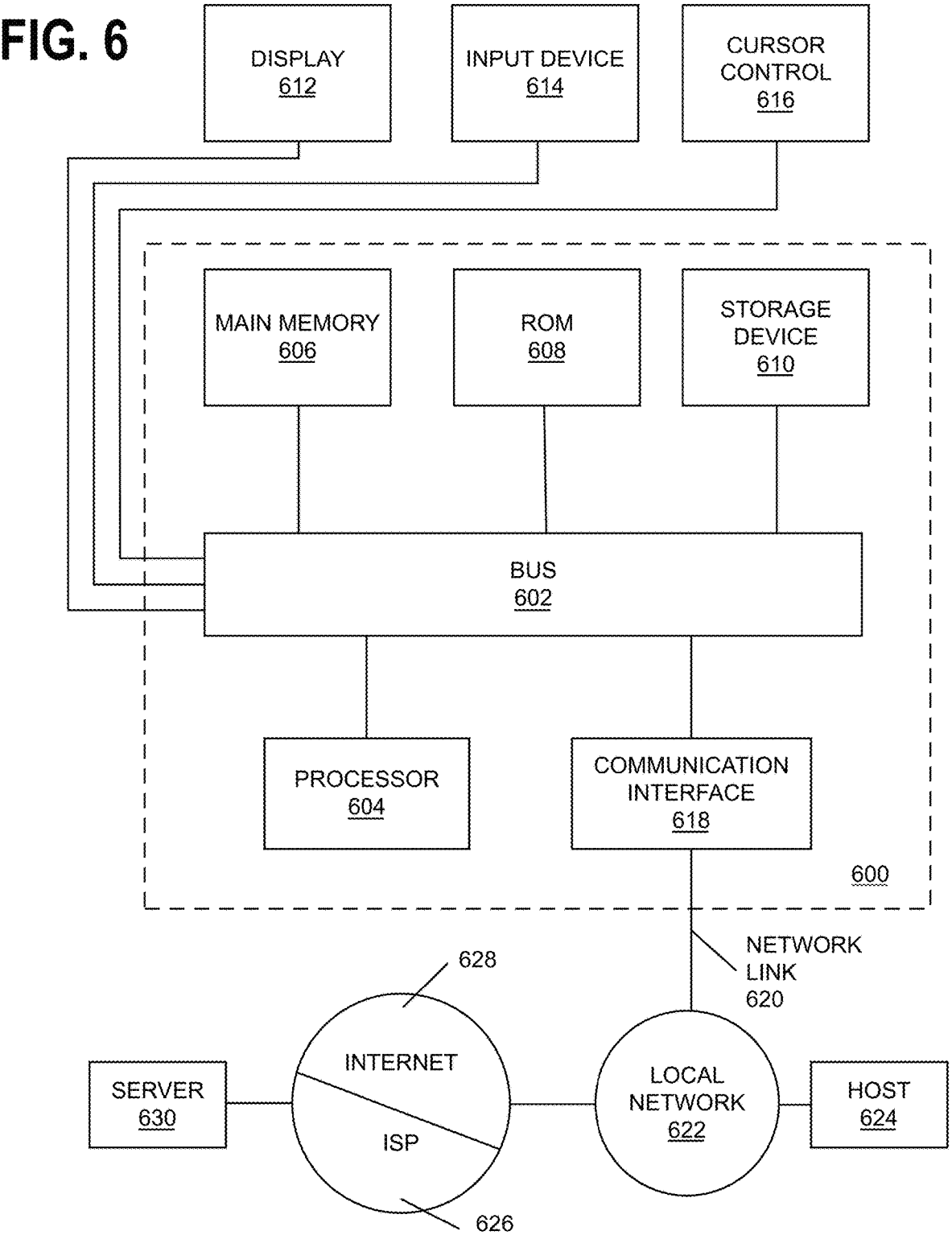

HYPER PARAMETER TUNING FOR MACHINE LEARNING MODELS

TECHNICAL FIELD

The present disclosure relates to machine learning models and learning algorithms. In particular, the present disclosure relates to hyper parameter value selection for machine learning models across multiple partitions.

BACKGROUND

A set of hyper parameters (HP) of a machine learning (ML) model define an overall structure of the machine learning model. The structure of a machine learning model may include, for example, a number of hidden nodes of a neural-network that are utilized for computations and metrics used for modifying the machine learning model. Each individual hyper parameter is a parameter whose value is used to control the machine learning model and underlying algorithm. By contrast, values of other parameters used in the machine learning model (typically node weights) are learned over time during training of the machine learning model. Choosing appropriate hyper parameter values is paramount for building a machine learning model that will perform its assigned tasks in an expected and expedient manner.

Selecting appropriate hyper parameter values requires striking a balance between defining the machine learning model to be complex enough to learn applicable patterns for the dataset, while not being overly complex and only remembering observed data, resulting in overfitting. Finding appropriate hyper parameter values involves training a new machine learning model multiple times while adjusting the hyper parameter values, and is a time consuming and resource intensive process. When separate machine learning models are to be deployed across different partitions in a dataset for a particular organization, training these multiple separate machine learning models to establish appropriate hyper parameter values is time consuming.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram of an example computing system that may implement the features and processes of FIGS. 1-5.

Reference symbols in the various drawings that have the same number indicate like elements.

DETAILED DESCRIPTION

Figure 1:
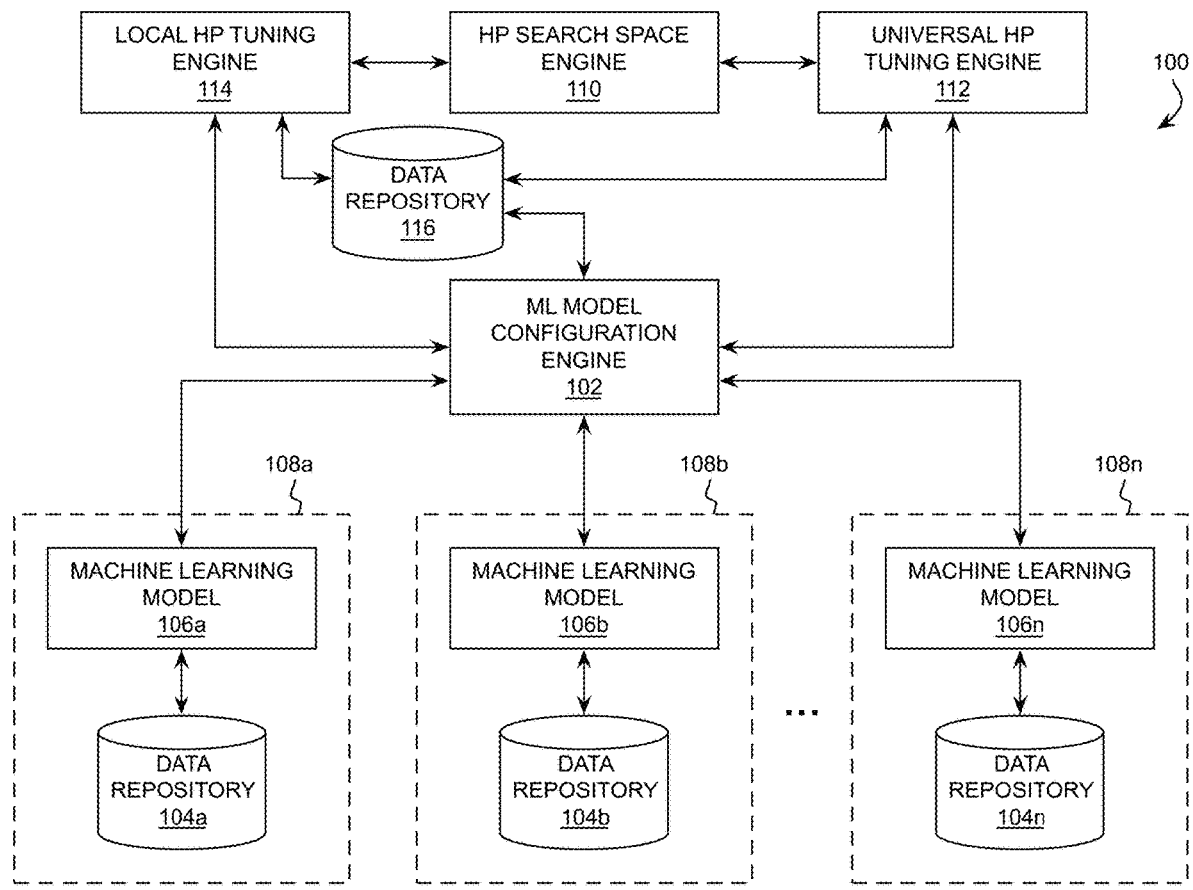
FIG. 1 illustrates a system for hyper parameter selection for multiple instances of a machine learning model in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Details of particular embodiments are provided with respect to the various drawings and the descriptions below. Other enhancements, features, details, and/or advantages of the particular embodiments may be ascertainable by those of skill in the art upon reading the present descriptions and viewing the drawings.

Also, the particular embodiments described herein may be implemented in any computing system environment known in the art, which may include one or more processors and a computer-readable medium configured to store logic, the logic being implemented with and/or executable by the one or more processors to cause the one or more processors to perform operations specified by the logic.

The descriptions presented herein relay sufficient information to enable a person having ordinary skill in the art to make and use the present invention and are provided in the context and requirements of particular embodiments of the present invention.

It is also noted that various modifications to the disclosed embodiments will be readily apparent to a person having ordinary skill in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

Also, unless otherwise specifically defined herein, all terms are to be given their broadest possible interpretation including meanings implied from the specification as well as meanings understood by a person having ordinary skill in the art and/or as defined in dictionaries, treatises, etc.

Moreover, the term "about" when used herein to modify a value indicates a range that includes the value and less and greater than the value within a reasonable range. In the absence of any other indication, this reasonable range is plus and minus 10% of the value. For example, "about 10 milliseconds" indicates 10 ms±1 ms, such that the range includes all values in a range including 9 ms up to and including 11 ms. In addition, the term "comprise" indicates an inclusive list of those elements specifically described without exclusion of any other elements. For example, "a list comprises red and green" indicates that the list includes, but is not limited to, red and green. Therefore, the list may also include other colors not specifically described.

1. GENERAL OVERVIEW
2. ARCHITECTURAL OVERVIEW
3. UNIVERSAL HYPER PARAMETER TUNING
4. LOCAL HYPER PARAMETER TUNING
5. HYPER PARAMETER PERFORMANCE
6. HYPER PARAMETER SEARCH SPACE
7. EXAMPLE EMBODIMENTS
   7.1 UNIVERSAL VERSUS LOCAL HYPER PARAMETERS
   7.2 COLD START
   7.3 RETUNING
   7.4 HYPER PARAMETER METADATA
8. COMPUTER NETWORKS AND CLOUD NETWORKS
9. HARDWARE OVERVIEW
10. MISCELLANEOUS; EXTENSIONS

1. General Overview

One or more embodiments describe selecting universal hyper parameters for use in a set of machine learning models across multiple computing environments. The set of universal hyper parameters dictate configuration of the set of machine learning models that are independently executing, respectively, in the multiple computing environments. Based on detection of a triggering condition, a first subset of universal hyper parameters from the set of universal hyper parameters are altered to generate a second set of universal hyper parameters. The second set of universal hyper parameters are applied to the set of machine learning models across the multiple computing environments. The triggering condition may correspond to a set of conditions within a single computing environment, or a set of conditions across multiple computing environments. Accordingly, in at least some embodiments, conditions within a single computing environment may result in updating universal hyper parameters across multiple computing environments.

Combined data from all the computing environments that are representing the same business domain, even with the complexity of the data in each partition varying, will share similar (if not the same) level of complexity, hence a common (universal) set of HP will serve most computing environments of the data. For the remaining computing environments which do not include data similar enough or when the data in the computing environment starts drifting over time, the system will perform a localized HP search around the last known ideal HP values (or set of universal HP).

Given that HP tuning relies on training an ML model multiple times (on the order of tens to hundreds of operations), HP tuning is an expensive operation during building of the ML model. By utilizing universal HP across multiple computing environments, the time for this operation may be reduced.

One or more embodiments described in this Specification and/or recited in the claims may not be included in this General Overview section.

2. Architectural Overview

FIG. 1 illustrates a system 100 for hyper parameter (HP) selection for multiple instances of a machine learning (ML) model in accordance with one or more embodiments. As illustrated in FIG. 1, system 100 includes a ML model configuration engine 102, a plurality of computing environments 108, a HP search space engine 110, a universal HP tuning engine 112, a local HP tuning engine 114, and a data repository 116. Each computing environment 108 includes an instance of a ML model 106 electronically coupled to a data repository 104 that stores data used in the respective computing environments 108.

In various approaches, each of the ML models 106 executing within the various computing environments 108 may be based on the same ML model (e.g., an instance of the same ML model) or based on different ML models (e.g., using different algorithms, models, parameters, etc.). However, for the remainder of these descriptions, it is assumed that each ML model 106 is an instance of a common ML model that may be modified to more effectively execute for data in a data repository 104 of a specific computing environment 108. This enables a universal set of HP to be used in each ML model 106 executing within the various computing environments 108 (e.g., the same set of universal HP for ML model 106a, ML model 106b, etc.), instead of computing sets of local HP to be used in each ML model 106 individually (e.g., a different set of local HP used for ML model 106a in computing environment 108a compared to a set of local HP used for ML model 106b in computing environment 108b, etc.).

ML model configuration engine 102 is electronically coupled to the computing environments 108, HP search space engine 110, universal HP tuning engine 112, local HP tuning engine 114, and data repository 116, for sending and/or receiving data, commands, instructions, and configurations between the various components of system 100.

Because different instances of the same ML model may utilize different constraints, weights, and/or learning rates to generalize different data patterns, HP are used to adjust these different aspects of the ML model to optimally solve a problem. HP optimization finds a set of HP that yields an optimal ML model which minimizes a predefined loss function on a set of independent data. In one embodiment, the set of universal HP are not modified during training of the plurality of ML models 106.

In an approach, ML model configuration engine 102 is configured to obtain, receive, and/or generate a set of universal HP for use in the ML models 106 that are independently executing, respectively, in the multiple computing environments 108. The set of universal HP dictate configuration of the various ML models 106. For example, the set of universal HP may set a number of nodes for each ML model 106, control a weight that each node receives in the ML model, etc.

In one approach, universal HP tuning engine 112 is configured to tune a set of universal HP to optimize the set given a dataset representative of all data stored in the various data repositories 104. In an approach, universal HP tuning engine 112 may receive instruction from HP search space engine 110 as to how to determine values for the various universal HP in the set, and where to search for such values, as described in more detail herein. In a further approach, universal HP tuning engine 112 may be configured to generate, alone or in conjunction with ML model configuration engine 102, the set of universal HP for use in each of the ML models 106 executing independently in the various computing environments 108. Any optimization technique may be used to generate and/or tune the set of universal HP to be used in each of the ML models 106 across system 100, such as a grid search, a random search, a pseudo-random search, a Bayesian optimization, a gradient-based optimization, an evolutionary optimization, population-based search, a Distributed Asynchronous Hyper-parameter Optimization (HyperOpt), etc.

In addition, ML model configuration engine 102 and/or universal HP tuning engine 112 may be configured to store the set of universal HP to data repository 116, along with other relevant data, such as a timestamp for generation and/or deployment of the set of universal HP, scoring data for at least one of the ML models 106, training data for at least one of the ML models 106, etc.

In one approach, local HP tuning engine 114 is configured to tune a set of local HP to optimize the set given a dataset representative of data stored to a particular data repository 104b of a particular computing environment 106b. In an approach, local HP tuning engine 114 may receive instruction from HP search space engine 110 as to how to determine values for the various local HP in the set, and where to search for such values, as described in more detail herein. In a further approach, local HP tuning engine 114 may be configured to generate, alone or in conjunction with ML model configuration engine 102, the set of local HP for use in the particular ML model 106b executing in the particular computing environment 108b. Any optimization technique may be used to generate and/or tune the set of local HP to be used in the particular ML model 106b, such as a grid search, a random search, a Bayesian optimization, a gradient-based optimization, an evolutionary optimization, population-based search, etc.

In addition, ML model configuration engine 102 and/or local HP tuning engine 114 may be configured to store the set of local HP to data repository 116, along with other relevant data, such as a timestamp for generation and/or deployment of the set of local HP on the particular ML model 106b, scoring data for the ML model 106b, training data for the ML model 106b, etc.

ML model configuration engine 102 is configured to detect conditions regarding the various ML models 106, computing environments 108, data repositories 104, and aspects of system 100. One of these detected conditions may be a triggering condition (e.g., cause a response) for tuning HP that are used in one or more of the ML models 106 executing on a computing environment 108 (for example, ML model 106a executing in computing environment 108a on data stored to data repository 104a).

There may be different triggering conditions for tuning the set of universal HP compared with triggering conditions for tuning a set of local HP, as discussed in more detail herein. However, some of the triggering conditions may be the same for causing tuning of sets of universal HP and for causing tuning of a set of local HP.

Some example triggering conditions for tuning a set of local HP include, but are not limited to, a certain amount of time having transpired since last generating, retuning, and/or deploying a set of local HP for a particular computing environment 108 (e.g., computing environment 108b), detecting a change to data (as stored to a data repository 104, e.g., data repository 104b) in the particular computing environment 108b, performance of a ML model 106 (e.g., ML model 106b) executing on the particular computing environment 108b being less than a first threshold value, a predicted performance being less than a second threshold value for future scoring of the ML model 106b executing on the particular computing environment 108b, etc.

Some example triggering conditions for tuning the set of universal HP include, but are not limited to, a certain amount of time having transpired since last generating, retuning, and/or deploying a set of universal HP for the multiple computing environments 108, detecting a change to data (as stored to data repositories 104) across the computing environments 108 and/or within a particular computing environment by more than a threshold percentage/amount, performance of more than one ML model 106 (e.g., ML model 106a and ML model 106b) being less than a first threshold value, a predicted performance being less than a second threshold value for future scoring of a subset of ML models (e.g., across some, but possibly not all, ML models 106), addition of a new computing environment (not shown), etc.

In several examples, the amount of time that has transpired may be measured from a start point by a timer, clock, ticker, or some other time-keeping mechanism, or it may be measured by setting a future time that triggers retuning of the set of HP and/or replacement of the set of HP. The start point for timing purposes may be a time when a set of HP are deployed on one or more ML models, a time when a set of HP are generated for use in one or more ML models, a time when a set of HP are retuned for one or more ML models, etc.

Change to data may be detected based on a change in size of the data in one or more data repositories 104 by a certain percentage measured against the mean of a size of each data repository 104, measured against standard deviation, measured against the median size of the data repositories 104, etc. The change in size may be detected based on any of these measures, and then compared to a predetermined threshold value (which may be an absolute amount of change, a percentage of change, a ratio of change, etc.). When the amount of change is greater than the predetermined threshold value, it triggers retuning of the set of HP used for the ML model related to the data repository that experienced the change in data.

In one approach, the set of universal HP may be retuned based on the change in data of a single data repository (e.g., data repository 104a). In another approach, a set of local HP used for ML model 106a may be retuned based on the change in data of data repository 104a without effecting the set of universal HP used for the other ML models in other computing environments 108.

The change in data may be detected for a single data repository (e.g., data repository 104a) or across two or more data repositories 104. Change across multiple data repositories 104 may trigger retuning of the set of universal HP, while change for a single data repository (e.g., data repository 104a) may trigger retuning of a set of local HP used in the ML model 106a for the computing environment 108a related to the data repository 104a.

The performance of ML model(s) 106 may be measured by determining an accuracy of scoring producing by a particular ML model (e.g., ML model 106b) or across multiple ML models 106. Each ML model makes determinations, decisions, and/or predictions, and these are referred to as scoring. Once the ML model produces scores, the accuracy of these scores may be measured, and a pattern or trend for the scores may be calculated over time for any particular ML model. When a ML model produces scores that have an accuracy less than a threshold value (based on what type of scores are being produced), it may trigger retuning of the set of HP used in the ML model. Similarly, when the trend for scores of a ML model indicates that accuracy of future scoring will drop below a threshold value (based on what type of scores are being produced), it may trigger retuning of the set of HP used in the ML model.

In one approach, ML model configuration engine 102 is configured to adjust a first subset of universal HP from the set of universal HP to generate a set of updated universal HP (including the first subset of adjusted HP and all unchanged HP from the set of universal HP) based on detecting a triggering condition for retuning the set of universal HP. ML model configuration engine 102 may receive the set of updated universal HP, or some portion thereof, from the universal HP tuning engine 112 in an embodiment.

In an approach, ML model configuration engine 102 is configured to adjust a first subset of local HP from the set of local HP to generate an updated set of local HP (including the first subset of local HP and all unchanged HP from the set of local HP) based on detecting a triggering condition for retuning the set of local HP. ML model configuration engine 102 may receive the set of updated local HP, or some portion thereof, from the local HP tuning engine 114 according to one embodiment.

ML model configuration engine 102 is configured to apply the set of updated universal HP to the plurality of ML models 106 across the plurality of computing environments 108. Moreover, ML model configuration engine 102 is configured to deploy the set of local HP (when appropriate) to a particular ML model (e.g., ML model 106*b*) executing on a particular computing environment (e.g., computing environment 108*b*).

According to an approach, ML model configuration engine 102 is configured to deploy the set of universal HP and/or the set of updated universal HP in an instance of the ML model 106 for analyzing and managing data in an associated data repository for the new computing environment.

According to one embodiment, a deviation in size of data or datasets stored to each of the data repositories 104 for each of the plurality of computing environments 108 does not exceed a threshold amount, e.g., 10%, 15%, 20%, 25%, 30%, etc. This threshold amount may be adjusted to be greater or less in accordance with observations of system 100 and how the plurality of ML models 106 operate using the set of universal HP, alone or in comparison with a different candidate set of universal HP.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 8, titled "Computer Networks and Cloud Networks."

In one or more embodiments, data repository 116 is any type of storage unit and/or device (e.g., a file system, database, collection of tables, or any other storage mechanism) for storing data. Further, data repository 116 may include multiple different storage units and/or devices. The multiple different storage units and/or devices may or may not be of the same type or located at the same physical site. Further, data repository 116 may be implemented or may execute on the same computing system as ML model configuration engine 102, HP search space engine 110, universal HP tuning engine 112, and/or local HP tuning engine 114. Alternatively or additionally, data repository 116 may be implemented or executed on a computing system separate from ML model configuration engine 102, HP search space engine 110, universal HP tuning engine 112, and/or local HP tuning engine 114. Data repository 116 may be communicatively coupled to ML model configuration engine 102 via a direct connection or via a network.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Universal Hyper Parameter Tuning

Values assigned to a set of universal HP are expected to provide a designated or required minimum accuracy for most computing environments in a system. This minimum accuracy may be set by an administrator, automatically set based on one or more factors observable by the computing device, etc. In one approach, the values for the set of universal HP may be determined by performing universal HP tuning and/or generation on a dataset representing all data repositories in the system.

Figure 2:
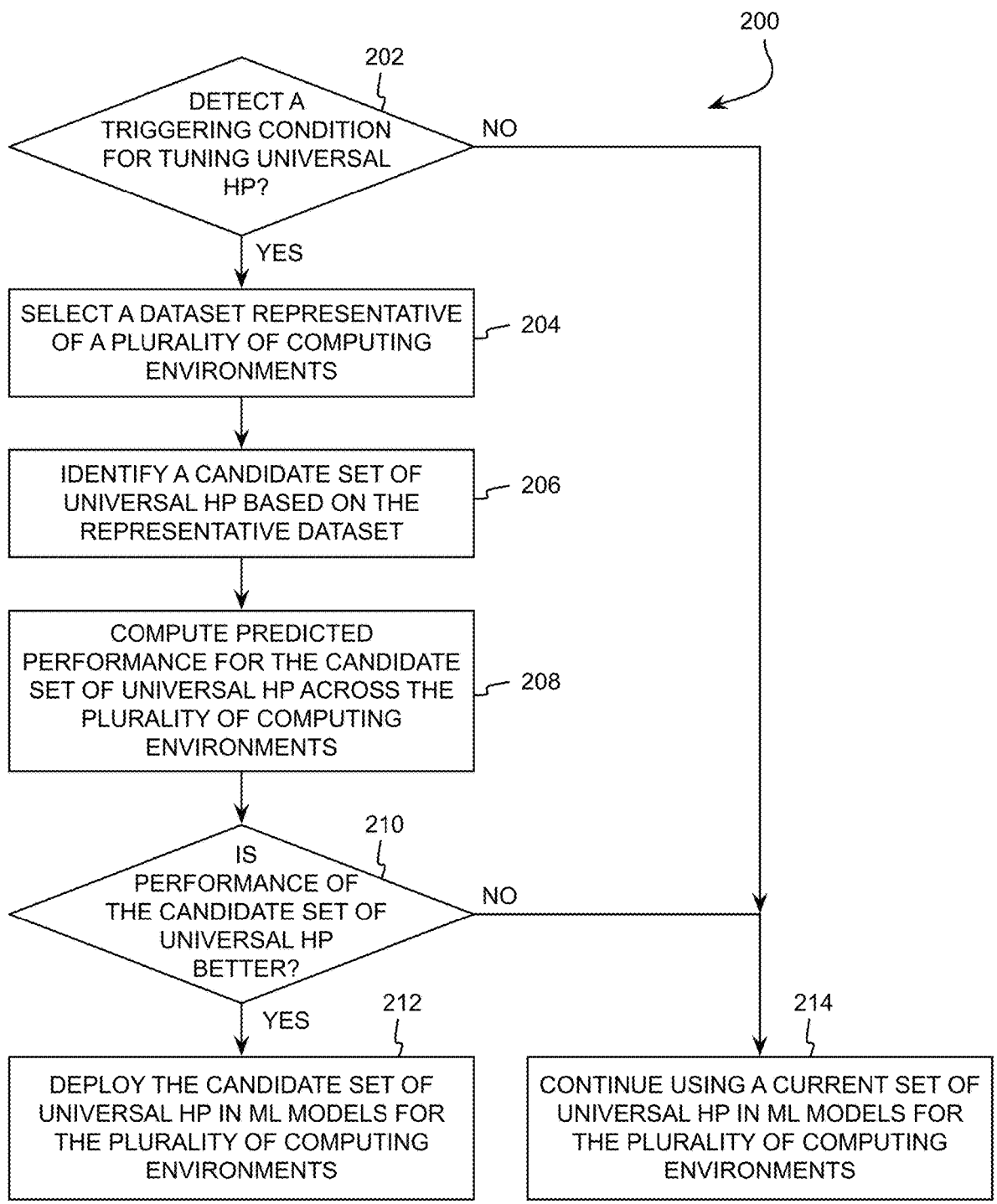
FIG. 2 illustrates an example method for universal hyper parameter selection for machine learning models across multiple computing environments, in accordance with one or more embodiments.

FIG. 2 illustrates an example method for universal hyper parameter selection (e.g., universal HP tuning) for machine learning models across multiple computing environments, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

Method 200 may be performed by any suitable component of system 100 in FIG. 1 or another computing device, such as ML model configuration engine 102, HP search space engine 110, universal HP tuning engine 112, local HP tuning engine 114, and/or combinations thereof. For the remainder of the descriptions of FIG. 2, method 200 will be described as performed by a computing device.

In operation 202, the computing device attempts to detect a triggering condition for tuning a set of universal HP. This triggering condition may also cause a set of universal HP to be generated, if one does not already exist. Any triggering condition may occur and concurrently be detected by the computing device, such as expiration of a timer, change in data, degradation of performance for one or more ML models executing in the computing environments of the system, etc. If a triggering condition is detected, method 200 proceeds to operation 204; otherwise, the computing device continues to use the current set of universal HP in ML models in the computing environments of the system in operation 214.

Some example triggering conditions for tuning the set of universal HP include, but are not limited to, a certain amount of time having transpired since last generating, retuning, and/or deploying a set of universal HP for the multiple computing environments, detecting a change to data across the computing environments and/or within a particular computing environment by more than a threshold percentage/amount, performance of more than one ML model being less than a first threshold value, a predicted performance being less than a second threshold value for future scoring of a subset of ML models (e.g., across some, but possibly not all, ML models), addition of a new computing environment (not shown), etc.

In an approach, a triggering condition isolated or unique to a single computing environment (such as change in data, time since last update, etc.) may cause an update to the set of universal HP used across a plurality of computing environments (possibly including the single computing environment that triggered the update, but not required). This update includes universal HP tuning, e.g., performing a search for a candidate set of universal HP to replace the current set of universal HP.

In one approach, a triggering condition may rely on detecting conditions across at least n number of computing environments, with n being a parameter that may be set manually by an administrator and/or automatically determined based on the number of computing environments or partitions in the system. In other words, if a triggering condition is experienced in less than n computing environments, then a universal set of HP are not retuned. However, this situation may cause one or more sets of local HP to be generated and/or tuned.

In order to decide whether to update an existing HP in a set of HP for a computing environment with a new, candidate HP discovered as part of a set of local or universal HP, each HP value in the existing set of HP is associated with an expected model accuracy when using the HP values. The expected accuracy for a new candidate HP value is set to be equal to the accuracy observed during the HP search. The expected accuracy of an existing HP is equal to the accuracy last observed with the set of HP used in the computing environment currently.

An existing HP set is updated with one or more new candidate HP values (discovered either as part of a search for local or universal HP) in response to the expected accuracy of the new HP value (or set of candidate HP) being greater than the expected accuracy of the existing HP value (or existing set of HP). This prevents wrongfully overriding a better performing HP value for a computing environment with a probably worse performing new universal HP.

In a further approach, a triggering condition may rely on detecting conditions in at least n computing environments that indicate a need for tuning all universal HP in the set of universal HP. In this case, the entire set of universal HP will be retuned, e.g., a search is performed to find a candidate set of universal HP to replace the current set of universal HP.

Similarly, in one approach, a triggering condition may rely on detecting conditions in at least n computing environments that indicate a need for tuning a particular subset of universal HP in the set of universal HP. In this case, only the subset of universal HP will be retuned, e.g., a search is performed to find a candidate subset of universal HP to replace the current subset of universal HP.

According to one embodiment, a tally may be maintained in a data repository of a number and identity of computing environments where performance fails to meet threshold performance criteria. Once a certain number of ML models for different computing environments (e.g., at least n computing environments) fail to meet a performance threshold, retuning of HP is triggered, either locally or universally, to improve performance of these under-performing ML models.

In several examples, the amount of time that has transpired may be measured from a start point by a timer, clock, ticker, or some other time-keeping mechanism, or it may be measured by setting a future time that triggers retuning of the set of HP and/or replacement of the set of HP. The start point for timing purposes may be a time when a set of HP are deployed on one or more ML models, a time when a set of HP are generated for use in one or more ML models, a time when a set of HP are retuned for one or more ML models, etc.

Change to data may be detected based on a change in size of the data in one or more data repositories by a certain percentage measured against the mean of a size of each data repository, measured against standard deviation, measured against the median size of the data repositories, etc. The change in size may be detected based on any of these measures, and then compared to a predetermined threshold value (which may be an absolute amount of change, a percentage of change, a ratio of change, etc.). When the amount of change is greater than the predetermined threshold value, it triggers retuning of the set of HP used for the ML model related to the data repository that experienced the change in data.

In one approach, the set of universal HP may be retuned based on the change in data of a single data repository. In another approach, a set of local HP used for ML model may be retuned based on the change in data of data repository without effecting the set of universal HP used for the other ML models in other computing environments.

The change in data may be detected for a single data repository or across two or more data repositories. Change across multiple data repositories may trigger retuning of the set of universal HP, while change for a single data repository may trigger retuning of a set of local HP used in the ML model for the computing environment related to the data repository.

The performance of ML model(s) may be measured by determining an accuracy of scoring producing by a particular ML model or across multiple ML models. Each ML model makes determinations, decisions, and/or predictions, and these are referred to as scoring. Once the ML model produces scores, the accuracy of these scores may be measured, and a pattern or trend for the scores may be calculated over time for any particular ML model. When a ML model produces scores that have an accuracy less than a threshold value (based on what type of scores are being produced), it may trigger retuning of the set of HP used in the ML model. Similarly, when the trend for scores of a ML model indicates that accuracy of future scoring will drop below a threshold value (based on what type of scores are being produced), it may trigger retuning of the set of HP used in the ML model.

In operation 204, the computing device selects a dataset that is representative of a plurality of computing environments. This dataset may be selected using any suitable technique, including but not limited to, a stratified sampling across all data repositories of the plurality of computing environments. In an approach, structured query language (SQL) may be used in stratified sampling by analyzing SQL queries issued to each data repository. A sample size used for the representative dataset may equal an average size of a data repository, where each data repository encapsulates all data within a computing environment. Stratification is performed over a subset of data within each data repository (e.g., columns of the data, rows of data, etc.), so that each data repository is equally represented in the representative dataset for performing universal HP tuning.

In one embodiment, stratified sampling may be performed as part of the SQL query used to extract data from one or more autonomous transaction processing (ATP) tables which store data access to each of the data repositories.

In operation 206, the computing device identifies a candidate set of universal HP based on the representative dataset selected in operation 204. To identify a candidate set of universal HP, any search technique may be used, such as a grid search, a random or pseudo-random search, etc.

In operation 208, the computing device computes predicted or future performance for the candidate set of universal HP across the plurality of computing environments represented by the representative dataset. In one approach, performance may be measured by accuracy, as described in more detail herein.

In operation 210, the computing device determines whether the performance of the candidate set of universal HP is better than the performance of a current set of universal HP used in current ML models in the plurality of computing environments. In response to a determination that the performance of the candidate set of universal HP is better than the performance of the current set of universal HP, method 200 proceeds to operation 212; otherwise, method 200 proceeds to operation 214.

In operation 212, the computing device deploys the candidate set of universal HP in the ML models executing in the plurality of computing environments, as better performance is likely to occur with the candidate set of universal HP. Deploying in this sense may include updating the currently-used set of HP to conform to the candidate set of universal HP, replacing a subset of values within the currently-used set of HP to conform to the candidate set of universal HP, re-instantiating or rebooting each of the ML models using the candidate set of universal HP, etc.

In operation 214, the computing device causes the plurality of ML models in their respective computing environments to continue operating with the currently-used set of HP, as better performance is not likely to occur with the candidate set of universal HP.

4. Local Hyper Parameter Tuning

A computing environment for which the set of universal HP do not perform well may trigger a local HP search to find more suitable HP values for the computing environment. Every new set of HP is attested with an expected model accuracy. This expected model accuracy (for universal or local HP) is the accuracy observed during the HP search process.

For updating the HP value for a partition with new (proposed) HP values, the expected accuracy of the new HP values is compared with the last observed accuracy of the existing HP values. If the expected accuracy of the new HP is greater than or equal to the existing HP value's last observed accuracy, the HP values are updated, and last HP accuracy is reset.

Values assigned to a set of local HP are expected to provide a designated or required minimum accuracy for a particular computing environment in a system that is unable to achieve the designated or required minimum accuracy using the set of universal HP. This minimum accuracy may be set by an administrator, automatically set based on one or more factors observable by the computing device, etc. In one approach, the values for the set of local HP may be determined by performing local HP tuning and/or generation on a dataset representing a particular computing environment (and data repository) in the system.

Figure 3:
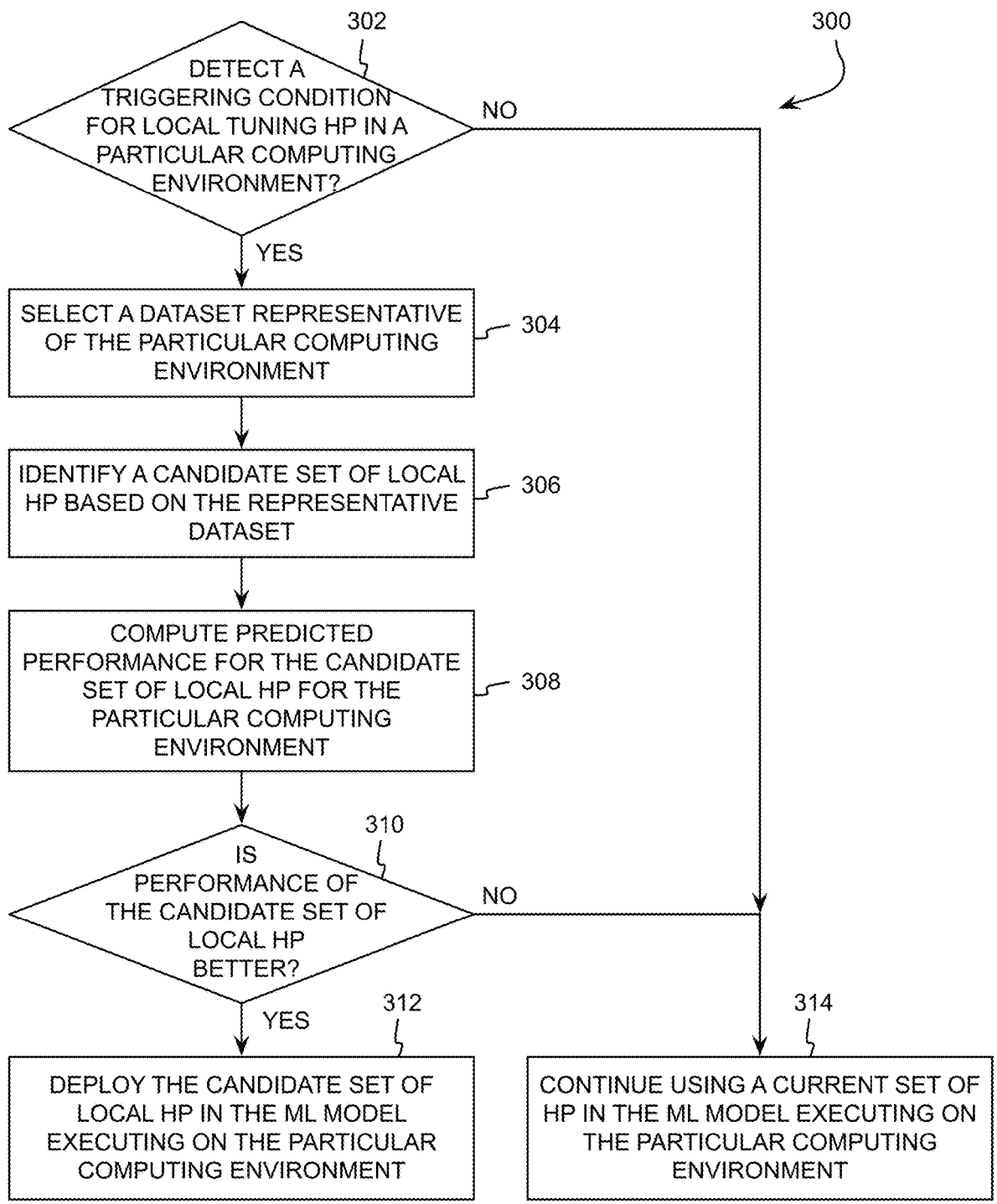
FIG. 3 illustrates an example method for local hyper parameter selection for a machine learning model, in accordance with one or more embodiments.

FIG. 3 illustrates an example method for local hyper parameter selection (e.g., local HP tuning) for a machine learning model in a particular computing environment, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

Method 300 may be performed by any suitable component of system 100 in FIG. 1 or another computing device, such as ML model configuration engine 102, HP search space engine 110, universal HP tuning engine 112, local HP tuning engine 114, and/or combinations thereof. For the remainder of the descriptions of FIG. 3, method 300 will be described as performed by a computing device.

In operation 302, the computing device attempts to detect a triggering condition for tuning a set of local HP. This triggering condition may also cause a set of local HP to be generated, if one does not already exist. Any triggering condition may occur and concurrently be detected by the computing device, such as expiration of a timer, change in data for the particular computing environment, degradation of performance for an ML model executing in the particular computing environment, etc. The triggering condition(s) for tuning the set of local HP may be the same or different from triggering conditions for tuning the set of universal HP, in several embodiments. If a triggering condition is detected, method 300 proceeds to operation 304; otherwise, the computing device continues to use the current set of HP in the ML model executing on the particular computing environment in operation 314.

Some example triggering conditions for tuning a set of local HP include, but are not limited to, a certain amount of time having transpired since last generating, retuning, and/or deploying a set of local HP for a particular computing environment, detecting a change to data (as stored to a data repository) in the particular computing environment, performance of a ML model executing on the particular computing environment being less than a first threshold value, a predicted performance being less than a second threshold value for future scoring of the ML model executing on the particular computing environment, etc.

In several examples, the amount of time that has transpired may be measured from a start point by a timer, clock, ticker, or some other time-keeping mechanism, or it may be measured by setting a future time that triggers retuning of the set of HP and/or replacement of the set of HP. The start point for timing purposes may be a time when a set of HP are deployed on one or more ML models, a time when a set of HP are generated for use in one or more ML models, a time when a set of HP are retuned for one or more ML models, etc.

Change to data may be detected based on a change in size of the data in one or more data repositories by a certain percentage measured against the mean of a size of each data repository, measured against standard deviation, measured against the median size of the data repositories, etc. The change in size may be detected based on any of these measures, and then compared to a predetermined threshold value (which may be an absolute amount of change, a percentage of change, a ratio of change, etc.). When the amount of change is greater than the predetermined threshold value, it triggers retuning of the set of HP used for the ML model related to the data repository that experienced the change in data.

In one approach, the set of universal HP may be retuned based on the change in data of a single data repository. In another approach, a set of local HP used for ML model 106a may be retuned based on the change in data of data repository without effecting the set of universal HP used for the other ML models in other computing environments.

The change in data may be detected for a single data repository (e.g., data repository 104a) or across two or more data repositories. Change across multiple data repositories may trigger retuning of the set of universal HP, while change for a single data repository may trigger retuning of a set of local HP used in the ML model 106a for the computing environment related to the data repository.

The performance of ML model(s) may be measured by determining an accuracy of scoring producing by a particular ML model or across multiple ML models. Each ML model makes determinations, decisions, and/or predictions, and these are referred to as scoring. Once the ML model produces scores, the accuracy of these scores may be measured, and a pattern or trend for the scores may be calculated over time for any particular ML model. When a ML model produces scores that have an accuracy less than a threshold value (based on what type of scores are being produced), it may trigger retuning of the set of HP used in the ML model. Similarly, when the trend for scores of a ML model indicates that accuracy of future scoring will drop below a threshold value (based on what type of scores are being produced), it may trigger retuning of the set of HP used in the ML model.

In operation 304, the computing device selects a dataset that is representative of a particular computing environment related to the triggering condition. For example, if performance of an ML model degrades below a threshold value, then the dataset will be chosen to represent the data for this particular ML model. This dataset may be selected using any suitable technique, including but not limited to, all data in a data repository of the particular computing environment, and a sampling across the data repository of the particular computing environment. In an approach, SQL may be used in the sampling by analyzing SQL queries issued to the particular data repository.

In operation 306, the computing device identifies a candidate set of local HP based on the representative dataset selected in operation 304. To identify a candidate set of local HP, any search technique may be used, such as a grid search, a random search, a pseudo-random search, etc.

In operation 308, the computing device computes predicted or future performance for the candidate set of local HP for the particular computing environment represented by the representative dataset. In one approach, performance may be measured by accuracy, as described in more detail herein.

In operation 310, the computing device determines whether the performance of the candidate set of local HP is better than the performance of a current set of HP (local or universal) used in the current ML model of the particular computing environment. In response to a determination that the performance of the candidate set of local HP is better than the performance of the current set of HP, method 300 proceeds to operation 312; otherwise, method 300 proceeds to operation 314.

In operation 312, the computing device deploys the candidate set of local HP in the ML model executing in the particular computing environment, as better performance is likely to occur with the candidate set of local HP. Deploying in this sense may include updating the currently-used set of HP to conform to the candidate set of local HP, replacing a subset of values within the currently-used set of HP to conform to the candidate set of local HP, re-instantiating or rebooting the ML model using the candidate set of local HP, etc.

In operation 314, the computing device causes the ML model in the particular computing environment to continue operating with the currently-used set of HP, as better performance is not likely to occur with the candidate set of local HP.

5. Hyper Parameter Performance

Figure 4:
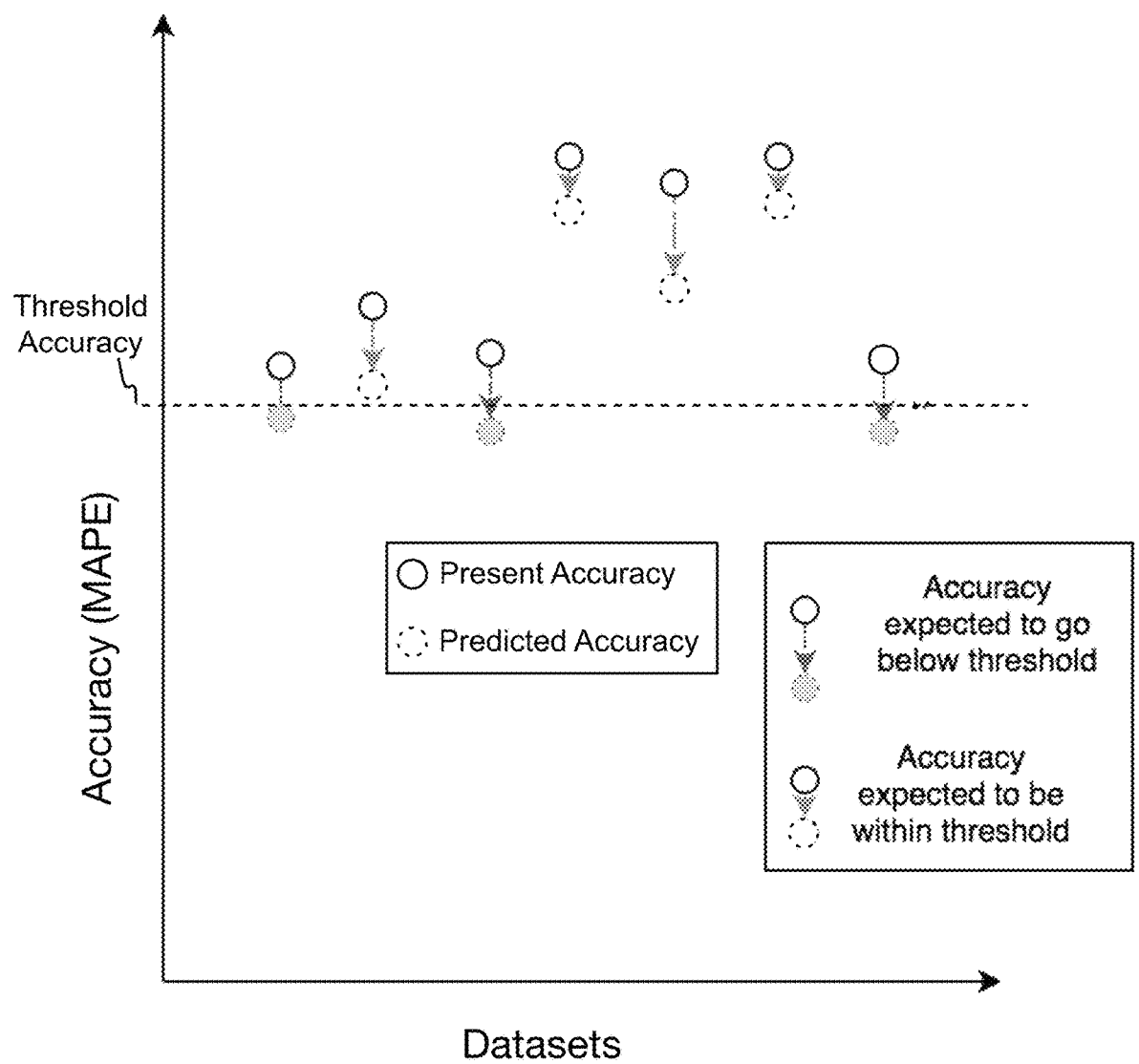
FIG. 4 is an example graph of present and predicted performance for ML models executing in various computing environments.

FIG. 4 is an example graph of present and predicted performance for ML models executing in various computing environments. One of the triggering conditions for tuning the set of universal HP is based on performance. Performance of different components and aspects of the plurality of computing environments may be determined and compared in order to determine whether to retune the set of universal HP. For example, performance of each ML model executing in its respective computing environment, performance of a subset of ML models executing in their respective computing environments, and performance of all ML models executing in the plurality of computing environments may each be considered when triggering universal HP retuning.

FIG. 4 shows an example where the performance (measured as accuracy of scoring) of some of the ML models ($1^{st}$, $3^{rd}$, and $7^{th}$) is expected to go below a designated accuracy threshold value in the near future. This threshold value may be set by an administrator, automatically set and/or adjusted dynamically by the computing device based on one or more factors (historical and present factors may be considered, such as performance trends, maximum, minimum, mean, average, and median performance values, etc.).

When the predicted accuracy of a certain number or percentage of the ML models drops below the accuracy threshold value, this may trigger retuning of the set of universal HP. Predicted accuracy (shown by the dashed circles) may be based on a performance trend over time, changes to data within a respective computing environment, user trends, or any other available information that is useful in predicting how well an ML model will score in future computations.

In an approach, when the present accuracy (shown as the solid circles) of a certain number or percentage of the ML models drops below the accuracy threshold value, retuning of the set of universal HP may be triggered.

In a further approach, when the present or predicted accuracy of a select ML model drops below the accuracy threshold value, this may trigger retuning and/or generation of a set of local HP in lieu of continued use of the set of universal HP. This case is useful when the other ML models have not experienced a similar drop in accuracy as the select ML model, indicating that they are not experiencing the same deteriorations in underlying ML model behavior as the select ML model.

Moreover, the predicted accuracy may be based on a certain number of future training cycles for each ML model. Therefore, predicted accuracy may be viewed as a function of a number of future training cycles, and only those ML models whose predicted accuracy will fall below the accuracy threshold value within a certain number of training cycles will be marked for possible retuning. The expected training cycles for degradation of performance may be computed based on current performance measurements and a decrease in performance in the last one or more training cycles.

In an approach, a flag may be passed with data to indicate that retuning a set of HP is requested and/or appropriate.

6. Hyper Parameter Search Space

Any conventional HP search algorithm may be used for searching for HP within a defined search space. Some example search algorithms include, but are not limited to, a grid search, a random search, a pseudo-random search, a Bayesian optimization, a gradient-based optimization, an evolutionary optimization, population-based search, a HyperOpt, etc.

In an approach, whichever search algorithm is selected, it may be used for both local and universal HP searches. However, in each specific HP search, the HP search space may be defined differently. The search space defines a range of values that are considered for each individual HP within a set of HP for an ML model.

The search space includes a confined search space, an overall search space, and an HP knowledge repository. The HP knowledge repository is a knowledge base that is built over time and used to define the HP search subspaces that have high confidence, and a set of constraints on HP values intended to reduce HP search spaces and reduce time and resource usage when searching for a set of HP.

The confined search space is a search space defined around last known "ideal" values for a set of HP. These ideal values may be the last values used, an average of a last set of values used, values used when highest performance was achieved, etc. For example, if last ideal values for a set of HP had a tree depth of 10, the confined search space may be defined to be +/−2 over 10, resulting in a confined search space between 8 and 12.

The overall search space is a broader search space defined to cover allowed values for each individual HP. This HP space is static and does not vary over time. For example, a tree depth may take a value from 5 to 50. Therefore, the overall search space would be 5 to 50, fully encompassing all possible values for a particular HP.

The HP knowledge repository includes search spaces that are believed to have higher chances to find ideal HP values within them in comparison with all possible search spaces used in the past. In an approach, search constraints learned and/or found in the HP knowledge repository may be used in order to further limit the search space. For example, a constraint could be to limit a value of 'eta' to be between 0.05 to 0.1. This constraint would then limit the search space only for this particular value.

The HP search space for local HP tuning is similar to the HP search space defined for universal HP searching, except that sub-spaces may have a different share in the total HP search space used as the universal search space. For example, a local HP search space may have more confined search sub-spaces than the overall search sub-space.

Figure 5:
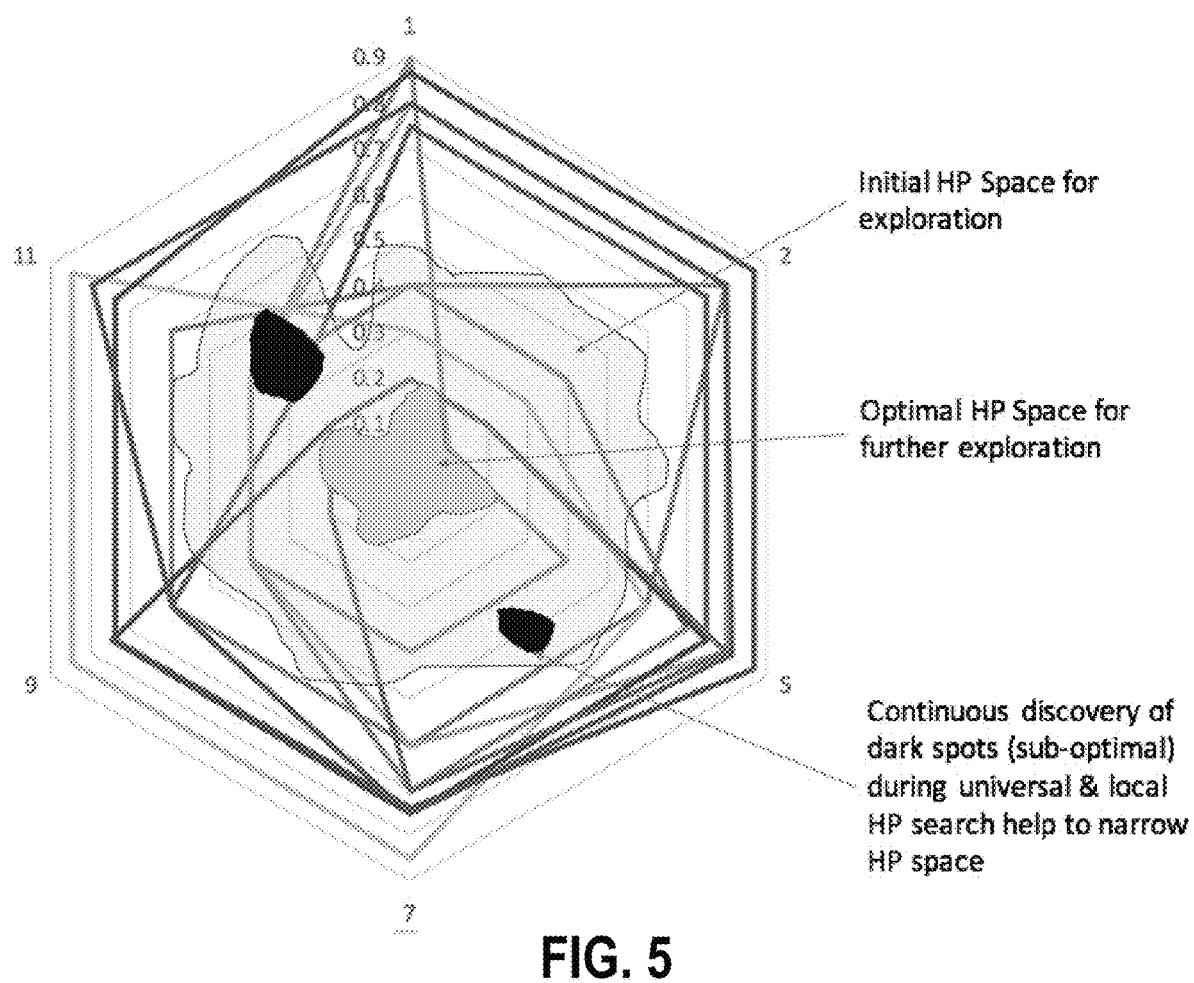
FIG. 5 represents an example hyper parameter search space that may be explored as part of a hyper parameter search process.

FIG. 5 represents an example HP search space that may be explored as part of an HP search process. Each edge in the plot represents one HP, and a distance from the center of the plot represents a value for that HP, scaled to be between 0 and 1. Each band represents an instance in the search process, with each HP variable taking a value. The multiple bands together represent all the sets of HP values that were explored by the HP search process (e.g., in a local or a global search process).

Initially, the example HP knowledge repository is broad, and the plot shows how the HP knowledge repository is augmented based on the HP search. Starting with an "initial HP space for exploration," the search algorithm explores multiple bands of values. In the process, some regions, e.g., "dark spots," are discovered as being areas where no suitable values are found in any HP set. Such dark spots are learned and noted as constraints in the HP knowledge repository. Similarly, other regions are learned which yield better performing HP values and noted as subspaces in the HP knowledge repository. The longer the search continues, the narrower the search space becomes allowing for more optimal HP values to be determined.

7. Example Embodiments

Detailed examples are described below for purposes of clarity. Components and/or operations described below should be understood as one specific example which may not be applicable to certain embodiments. Accordingly, components and/or operations described below should not be construed as limiting the scope of any of the claims.

7.1 Universal Versus Local Hyper Parameters

A set of HP is considered to be tuned (e.g., optimal) if one or more ML models that have been trained using the set of HP are able to achieve an accuracy greater than or equal to a certain threshold accuracy. This set of universal HP may be deployed on each ML model executing across the plurality of computing environments.

However, it is normal for data from one or more computing environments to behave differently from the rest of the computing environments for which the set of universal HP have been tuned. These divergent computing environments may benefit from having their own individual sets of local HP tuned independently for each divergent computing environment. require their own HP.

Universal HP include values for the various parameters that are expected to provide best performance for most of the computing environments. The set of universal HP are searched using a dataset representative of the plurality of computing environments.

A set of local HP are searched for a particular computing environment on a one-to-one basis. Local HP include values for the various parameters that are expected to provide best performance for the particular computing environment regardless of how they affect other computing environments. The set of local HP are searched using a dataset representative of the particular computing environment. In one embodiment, the set of local HP are searched for in response to the set of universal HP not providing acceptable accuracy for the particular computing environment, as measured against the accuracy threshold.

7.2 Cold Start

The set of universal HP may be used for a specific situation when a new computing environment is brought online for the first time, with the new computing environment being similar to the other computing environments used to create the representative dataset that was used to generate the set of universal HP.

In this situation, for a cold start of the new computing environment, the set of universal HP may be used for an instance of the ML model executing on the new computing environment. The set of universal HP may be used, at least initially, until training is performed and scoring of the ML model using the set of universal HP is accomplished. Once the ML model has been used long enough to ascertain its accuracy, if the ML model for the new computing environment does not perform well with the set of universal HP, a set of local HP values are generated.

Once the set of local HP are generated, they are tested against the set of universal HP to determine whether they provide better performance than the set of universal HP to determine whether to continue using the set of local HP or revert back to the set of universal HP.

7.3 Retuning

With the addition of new data at regular intervals (e.g., daily, weekly, etc.), it is anticipated that over time, the set of HP (universal and local) for the computing environments should be updated (retuned) to adapt to drifting complexity of the data in the computing environments. HP may be retuned at the local level (each computing environment) by retuning one or more sets of local HP and/or at the system-wide level (all computing environments) by retuning the set of universal HP.

7.4 Hyper Parameter Metadata

Each set of HP may include and/or be associated with metadata. The metadata is maintained along with actual values for the set of HP for each computing environment. Some example metadata that may be maintained includes, but is not limited to, last HP accuracy, HP update date or timestamp, HP accuracy trend, and last HP data description.

The last HP accuracy represents accuracy of the associated ML model during the last training process with the HP values associated with the metadata. This metadata may have a default (e.g., in a cold start situation where a computing environment is deployed with a set of universal HP) set to −1. In another embodiment, for a cold start, accuracy observed on the set of universal data may be used as the last HP accuracy. Moreover, when a computing environment is updated with a set of universal HP, its last HP accuracy is set to default (−1). This value is soon updated in response to the next training operation being performed for the computing environment. Whenever a new model is trained for the computing environment, the last HP accuracy value is updated.

The HP update date represents the date and/or time when HP values were last updated. The HP update date is set to the date when the HP values for the computing environment is updated as part of either a universal HP or local HP search.

The HP accuracy trend represents the change in the accuracy of the ML model since the last time the ML model was trained, using the same set of HP. The HP accuracy trend may have a default value of 0. It may be updated as part of the training process of a ML model for a computing environment. This metadata is updated before updating the last HP accuracy metadata. If the last HP accuracy metadata is not equal to −1, then it is set to (expected HP accuracy−last HP accuracy). If the last HP accuracy is equal to −1, then it is set to 0.

The last HP data description represents one or more metrics that describe the data that was used during the last HP tuning. These metrics may include data size, mean of sales value, and standard deviation of sales value. If updating the HP values with a set of universal HP, the metrics of the universal dataset are set. If updating the HP values with a set of local HP, the metrics of the computing environment's data is set.

In one or more embodiments, a non-transitory computer readable medium may store instructions, that when executed by a hardware processor, cause execution of one or more operations of any of the above-described methods. According to one or more embodiments, a system may include the non-transitory computer readable medium and the hardware processor.

Variations of the disclosed embodiments are also possible, and the explicit description thereof in this document is not required in order to provide a person having ordinary skill in the art with the ability to conceive of such variations when reading the present descriptions.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Computer Networks And Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a NAT. Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or solid state disk, is provided and coupled to bus 602 for storing information and instructions.

Computer system 600 may be coupled via bus 602 to a display 612, such as a liquid crystal display (LCD), plasma display, electronic ink display, cathode ray tube (CRT) monitor, or any other kind of device for displaying information to a computer user. An input device 614, including alphanumeric and other keys, may be coupled to bus 602 for communicating information and command selections to processor 604. Alternatively or in addition, the computer system 600 may receive user input via a cursor control 616, such as a mouse, a trackball, a trackpad, a touchscreen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. The display 612 may be configured to receive user input via one or more pressure-sensitive sensors, multi-touch sensors, and/or gesture sensors. Alternatively or in addition, the computer system 600 may receive user input via a microphone, video camera, and/or some other kind of user input device (not shown).

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, solid-state or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 600 can receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    obtaining a set of universal hyper parameters for a plurality of machine learning models including a first machine learning model and a second machine learning model, wherein the set of universal hyper parameters is used to dictate a first configuration and a second configuration;
    configuring a first machine learning model executing in a first computing environment in accordance with the first configuration;
    configuring a second machine learning model executing independently of the first machine learning model in a second computing environment in accordance with the second configuration;
    detecting, at the first computing environment, a triggering condition for tuning the set of universal hyper parameters;
    based on detecting the triggering condition, adjusting a first subset of universal hyper parameters from the set of universal hyper parameters to generate a second set of universal hyper parameters;
    applying the second set of universal hyper parameters to generate a third configuration; and
    updating the second machine learning model in accordance with the third configuration,
    wherein the method is performed by at least one device including a hardware processor.

2. The method as recited in claim 1, further comprising:
    detecting a second triggering condition at the second computing environment;
    based on the detected second triggering condition:
        searching for a candidate set of local hyper parameters;
        determining a first accuracy of the second machine learning model with the second set of universal hyper parameters applied;
        determining a second accuracy of the candidate set; and
        comparing the first accuracy to the second accuracy;
    in response to the second accuracy being greater than the first accuracy, applying the candidate set of local hyperparameters to generate a fourth configuration; and
    updating the second machine learning model in accordance with the fourth configuration.

3. The method as recited in claim 2, wherein the triggering condition is selected from a group consisting of: a certain amount of time having transpired since last generating the set of local hyper parameters, detecting a change to data in the first computing environment, a performance of the first machine learning model executing on the first computing environment being less than a first threshold value, and a predicted performance being less than a second threshold value for future scoring of the first machine learning model executing on the first computing environment.

4. The method as recited in claim 1, further comprising:
    detecting addition of a new computing environment; and
    deploying, to the new computing environment, an instance of the plurality of machine learning models using the second set of universal hyper parameters.

5. The method as recited in claim 1, wherein a deviation in size of datasets for each of the plurality of computing environments does not exceed a threshold amount.

6. The method as recited in claim 1, wherein the triggering condition is selected from a group consisting of: a certain amount of time having transpired since generating the set of universal hyper parameters, detecting a change to data in any computing environment by more than a threshold percentage, and a predicted performance being less than a threshold value for scoring of a second subset of the plurality of machine learning models.

7. The method as recited in claim 1, wherein the set of universal hyper parameters are not modified during training of the plurality of machine learning models.

8. A system, comprising:
    one or more hardware processors;
    a non-transitory computer readable medium comprising instructions which, when executed by the one or more hardware processors, causes performance of operations comprising:
        obtaining a set of universal hyper parameters for a plurality of machine learning models including a first machine learning model and a second machine learning model, wherein the set of universal hyper parameters is used to dictate a first configuration and a second configuration;

configuring a first machine learning model executing in a first computing environment in accordance with the first configuration;

configuring a second machine learning model executing independently of the first machine learning model in a second computing environment in accordance with the second configuration;

detecting, at the first computing environment, a triggering condition for tuning the set of universal hyper parameters;

based on detecting the triggering condition, adjusting a first subset of universal hyper parameters from the set of universal hyper parameters to generate a second set of universal hyper parameters;

applying the second set of universal hyper parameters to generate a third configuration; and updating the second machine learning model in accordance with the third configuration.

9. The system as recited in claim 8, wherein the operations further comprise:
   detecting a second triggering condition at the second computing environment;
   based on the detected second triggering condition:
   searching for a candidate set of local hyper parameters;
   determining a first accuracy of the second machine learning model with the second set of universal hyper parameters applied;
   determining a second accuracy of the candidate set; and
   comparing the first accuracy to the second accuracy;
   in response to the second accuracy being greater than the first accuracy, applying the candidate set of local hyperparameters to generate a fourth configuration; and
   updating the second machine learning model in accordance with the fourth configuration.

10. The system as recited in claim 9, wherein the triggering condition is selected from a group consisting of: a certain amount of time having transpired since last generating the set of local hyper parameters, detecting a change to data in the first computing environment, a performance of the first machine learning model executing on the first computing environment being less than a first threshold value, and a predicted performance being less than a second threshold value for future scoring of the first machine learning model executing on the first computing environment.

11. The system as recited in claim 8, wherein the operations further comprise:
    detecting addition of a new computing environment; and
    deploying, to the new computing environment, an instance of the plurality of machine learning models using the second set of universal hyper parameters.

12. The system as recited in claim 8, wherein a deviation in size of datasets for each of the plurality of computing environments does not exceed a threshold amount.

13. The system as recited in claim 8, wherein the triggering condition is selected from a group consisting of: a certain amount of time having transpired since generating the set of universal hyper parameters, detecting a change to data in any computing environment by more than a threshold percentage, and a predicted performance being less than a threshold value for scoring of a second subset of the plurality of machine learning models.

14. A non-transitory computer readable medium comprising instructions which, when executed by one or more hardware processors, causes performance of operations comprising:
    obtaining a set of universal hyper parameters for a plurality of machine learning models including a first machine learning model and a second machine learning model, wherein the set of universal hyper parameters is used to dictate a first configuration and a second configuration;
    configuring a first machine learning model executing in a first computing environment in accordance with the first configuration;
    configuring a second machine learning model executing independently of the first machine learning model in a second computing environment in accordance with the second configuration;
    detecting, at the first computing environment, a triggering condition for tuning the set of universal hyper parameters;
    based on detecting the triggering condition, adjusting a first subset of universal hyper parameters from the set of universal hyper parameters to generate a second set of universal hyper parameters;
    applying the second set of universal hyper parameters to generate a third configuration; and
    updating the second machine learning model in accordance with the third configuration.

15. The non-transitory computer readable medium as recited in claim 14, wherein the operations further comprise:
    detecting a second triggering condition at the second computing environment;
    based on the detected second triggering condition:
    searching for a candidate set of local hyper parameters;
    determining a first accuracy of the second machine learning model with the second set of universal hyper parameters applied;
    determining a second accuracy of the candidate set; and
    comparing the first accuracy to the second accuracy;
    in response to the second accuracy being greater than the first accuracy, applying the candidate set of local hyperparameters to generate a fourth configuration; and
    updating the second machine learning model in accordance with the fourth configuration.

16. The non-transitory computer readable medium as recited in claim 15, wherein the triggering condition is selected from a group consisting of: a certain amount of time having transpired since last generating the set of local hyper parameters, detecting a change to data in the first computing environment, a performance of the first machine learning model executing on the first computing environment being less than a first threshold value, and a predicted performance being less than a second threshold value for future scoring of the first machine learning model executing on the first computing environment.

17. The non-transitory computer readable medium as recited in claim 14, wherein the operations further comprise:
    detecting addition of a new computing environment; and
    deploying, to the new computing environment, an instance of the plurality of machine learning models using the second set of universal hyper parameters.

18. The non-transitory computer readable medium as recited in claim 14, wherein a deviation in size of datasets for each of the plurality of computing environments does not exceed a threshold amount, and wherein the set of universal hyper parameters are not modified during training of the plurality of machine learning models.

19. The non-transitory computer readable medium as recited in claim 14, wherein the triggering condition is selected from a group consisting of: a certain amount of time having transpired since generating the set of universal hyper parameters, detecting a change to data in any computing environment by more than a threshold percentage, and a predicted performance being less than a threshold value for scoring of a second subset of the plurality of machine learning models.

20. The method of claim 1, wherein adjusting the first set of universal hyper parameters comprises:
- searching for a first value for a hyper parameter of the first subset of universal hyper parameters;
- determining a first accuracy for the first value for the hyper parameter;
- determining a second accuracy of a second value for the hyper parameter, the second accuracy being determined by operation of the set of universal hyper parameters in the first computing environment;
- based on the first accuracy being greater than the second accuracy, assigning the first value to the hyper parameter in the second set of universal hyper parameters; and
- based on the first accuracy not being greater than the second accuracy, assigning the second value to the hyper parameter in the second set of universal hyper parameters.

\* \* \* \* \*